(12) United States Patent
Kim

(10) Patent No.: US 8,448,538 B2
(45) Date of Patent: May 28, 2013

(54) PARKING BRAKE LEVER APPARATUS

(75) Inventor: Hyun Wook Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 510 days.

(21) Appl. No.: 12/398,861

(22) Filed: Mar. 5, 2009

(65) Prior Publication Data

US 2010/0139441 A1 Jun. 10, 2010

(30) Foreign Application Priority Data

Dec. 4, 2008 (KR) ........................ 10-2008-0122197

(51) Int. Cl.
*G05G 1/04* (2006.01)
(52) U.S. Cl.
USPC ........................................................ 74/523
(58) Field of Classification Search
USPC ................. 74/491, 501.6, 520, 523, 524, 537
See application file for complete search history.

(56) References Cited

U.S. PATENT DOCUMENTS

| | | | |
|---|---|---|---|
| 2,464,096 A * | 3/1949 | Orscheln ........................ | 74/518 |
| 3,765,263 A * | 10/1973 | Buscher et al. ................. | 74/491 |
| 2007/0209469 A1* | 9/2007 | Otto ................................ | 74/523 |

FOREIGN PATENT DOCUMENTS

| | | |
|---|---|---|
| JP | 59-192457 U | 12/1984 |
| JP | 05-319228 A | 12/1993 |
| JP | 09-002216 A | 1/1997 |
| JP | 2001-141154 A | 5/2001 |
| JP | 2004-210107 A | 7/2004 |
| JP | 2005-36264 A | 2/2005 |
| KR | 1999-0029093 U | 7/1999 |
| KR | 10-0380437 B1 | 4/2003 |

* cited by examiner

*Primary Examiner* — Vicky Johnson
(74) *Attorney, Agent, or Firm* — Morgan, Lewis & Bockius LLP

(57) ABSTRACT

A parking brake lever apparatus for a vehicle may include a lever operably activated by a driver, a connecting member rotatably coupled to a support bracket which is fixed to a vehicle body and configured to support the connecting member, first and second rods, one ends of which are pivotally coupled to the lever with a predetermined distance therebetween and the other ends of which are connected to the connecting member, wherein the other end of the first rod is fixedly connected to rotation axis of the connecting member and the other end of the second rod is pivotally coupled to the connecting member and disposed with a predetermined distance from the rotation axis of the connecting member, and a position control unit to selectively hold the connecting member to a rotational position.

13 Claims, 3 Drawing Sheets (a)

(b)

PARKING BRAKE LEVER APPARATUS

CROSS-REFERENCE TO RELATED APPLICATIONS

The present application claims priority to Korean Patent Application Number 2008-0122197 filed on Dec. 4, 2008, the entire contents of which is incorporated herein for all purposes by this reference.

BACKGROUND OF THE INVENTION

1. Field of the Invention

The present invention relates to a parking brake lever apparatus for a vehicle.

2. Description of Related Art

FIG. 1 illustrates the operation of a conventional parking brake lever apparatus.

As illustrated in FIG. 1, the parking brake lever apparatus 10 includes a lever 20 pulled by a driver 40, and a lever bracket 30 having a lever rotating shaft 22 around which the lever 20 is rotated.

This parking brake lever apparatus 10 has a problem in that, when the driver 40 pulls the lever 20 in order to activate a parking brake, the lever 20 is excessively rotated around the lever rotating shaft 22, and thus a wrist 42 of the driver 40 is bent, and furthermore a shoulder 44 is bent when the wrist 42 is bent to the utmost limit.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide for a parking brake lever apparatus, which prevents a wrist from being bent when manipulated.

In an aspect of the present invention, the parking brake lever apparatus may include a lever pulled by a driver, first and second rods, first ends of which are connected with the lever through respective first and second lever hinge pins, and a lever bracket connected with second ends of the first and second rods disposed parallel to each other.

The first rod and the lever bracket may be connected through a first parking hinge pin, to which a parking cable connected with wheels is fixed. The second rod and the lever bracket may be connected through a second parking hinge pin.

The parking brake lever apparatus may further include a connecting member, which is installed between the first parking hinge pin and the parking cable. The first and second rods may be installed parallel to each other.

In another aspect of the present invention, a parking brake lever apparatus for a vehicle may include a lever operably activated by a driver, a connecting member rotatably coupled to a support bracket which is fixed to a vehicle body and configured to support the connecting member, first and second rods, one ends of which are pivotally coupled to the lever with a predetermined distance therebetween and the other ends of which are connected to the connecting member, wherein the other end of the first rod is fixedly connected to rotation axis of the connecting member and the other end of the second rod is pivotally coupled to the connecting member and disposed with a predetermined distance from the rotation axis of the connecting member, and a position control unit to selectively hold the connecting member to a rotational position.

The connecting member may be fixed to the other end of the first rod by a hinge pin which is rotatably coupled to the support bracket so that the connecting member is rotated by the hinge pin according to a rotation of the first rod.

A parking cable selectively engaged with wheels of the vehicle may be fixed to a position of the connecting member offset from the other end of the first rod with a predetermined distance.

The position control unit may include a lever bracket fixed to the vehicle body and having a ratchet, a pawl pivotally coupled to the first rod and selectively coupled to the ratchet of the lever bracket wherein the pawl is supported by an elastic member to supply a restoring force thereto, and an actuating member to actuate a rotation of the pawl.

The actuating member may include a release link pivotally coupled to the lever, a release rod coupling a release button and one end of the release link so as to transfer an external force applied to the release button to the one end of the release link, and a release cable connecting the other end of the release link and one end of the pawl to rotate the pawl.

The first and second rods may be installed parallel to each other.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
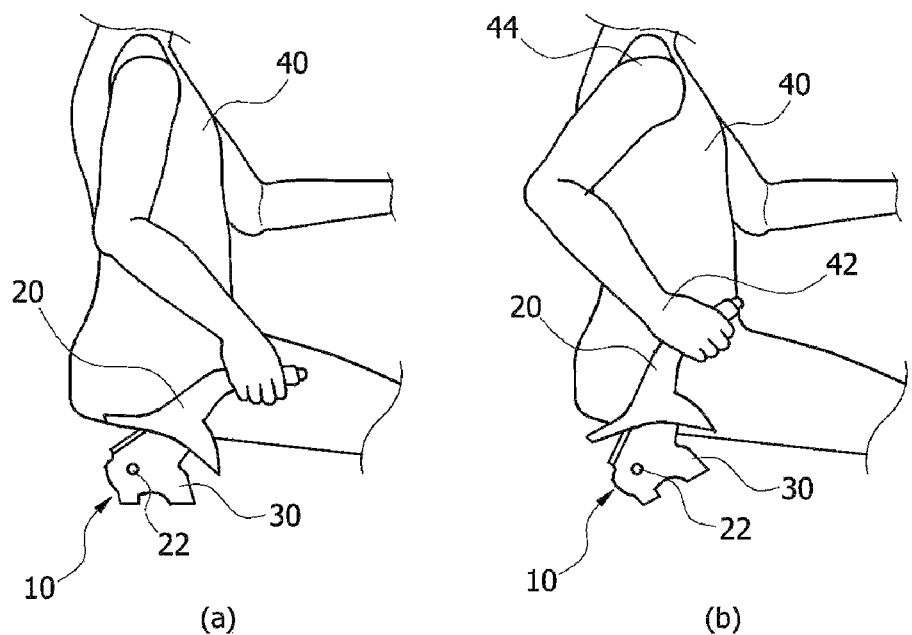
FIG. 1 illustrates the operation of a conventional parking brake lever apparatus.
Figure 2:
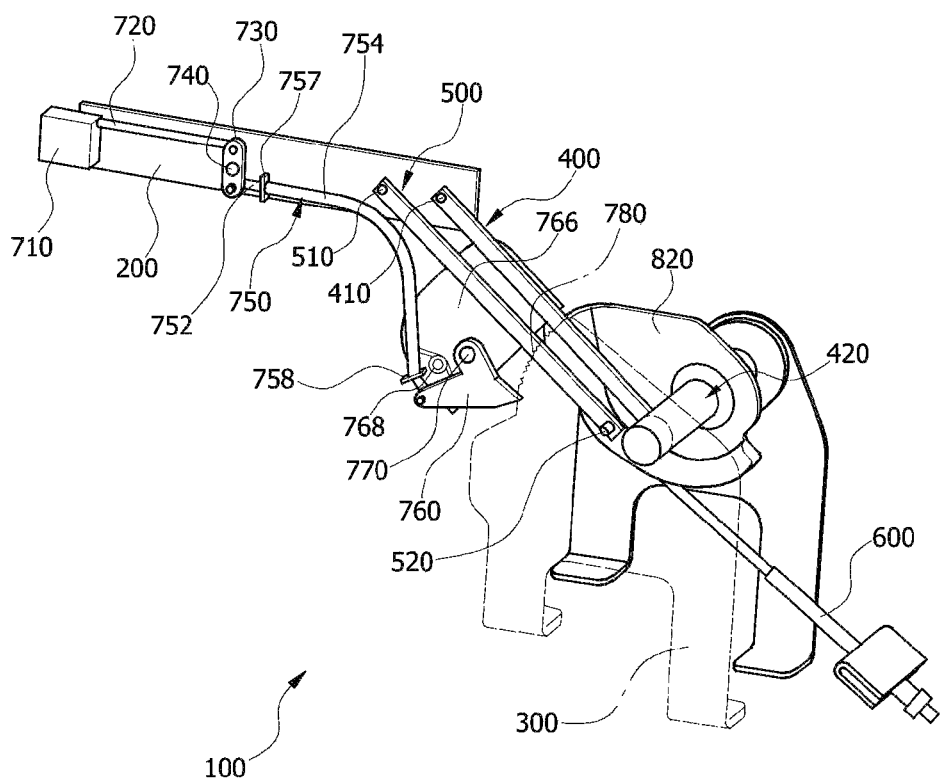
FIG. 2 is a perspective view illustrating an exemplary parking brake lever apparatus according to the present invention.
Figure 3:
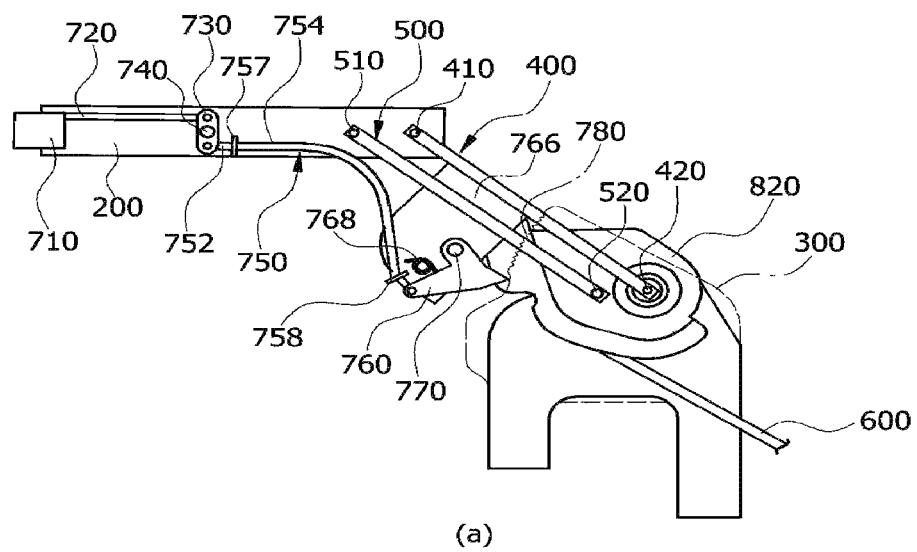
FIG. 3 illustrates a process of activating a parking brake of the parking brake lever apparatus of FIG. 2.
Figure 3:
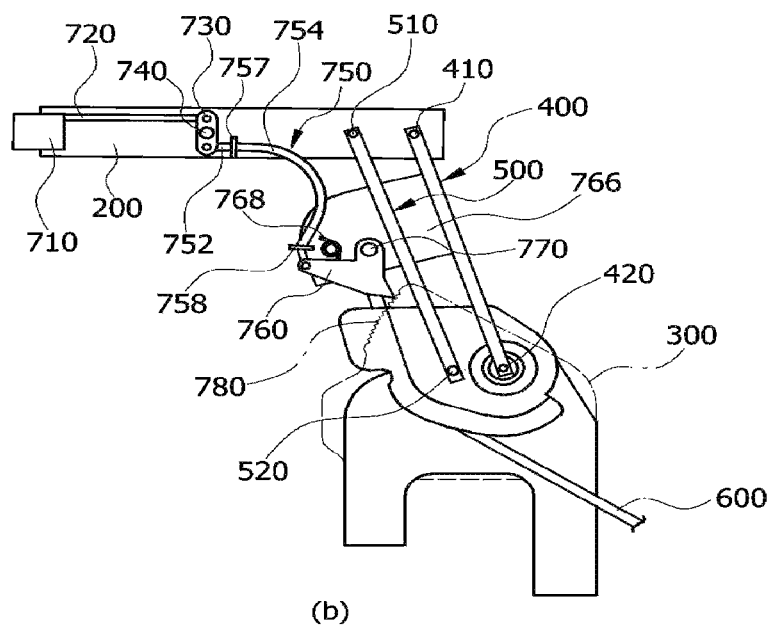
Figure 4:
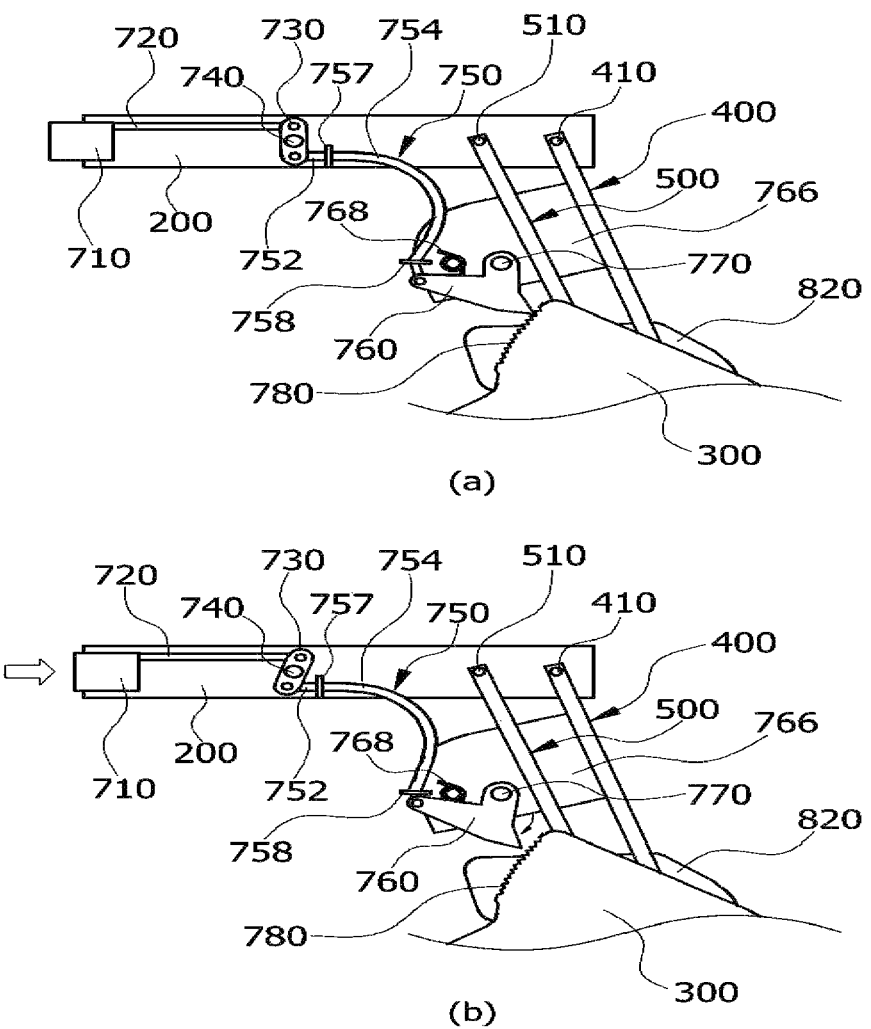
FIG. 4 illustrates a process of releasing a parking brake of the parking brake lever apparatus of FIG. 2.

FIG. 2 is a perspective view illustrating a parking brake lever apparatus according to various embodiments of the present invention. FIG. 3 illustrates a process of activating a parking brake of the parking brake lever apparatus of FIG. 2. FIG. 4 illustrates a process of releasing a parking brake of the parking brake lever apparatus of FIG. 2.

According to various embodiments, the parking brake lever apparatus 100 includes a lever 200 caught and pulled by a driver, first and second rods 400 and 500, the upper portions of which are hinged with the lever 200, and a connecting member 820 connected with lower ends of the first and second rods 400 and 500 respectively.

The first and second rods 400 and 500 are parallel to each other. The first rod 400 has a first lever hinge pin 410 pivotally connected with the lever 200 and a first parking hinge pin 420 fixedly connected with the connecting member 820 at upper and lower ends thereof, respectively.

Similarly, the second rod 500 has a second lever hinge pin 510 pivotally connected with the lever 200 and a second parking hinge pin 520 pivotally connected with the connecting member 820 at upper and lower ends thereof, respectively.

Further, in various embodiments of the present invention, the first parking hinge pin 420 is pivotally coupled to a support bracket 425 fixed to a vehicle body to rotatably support the connecting member 820. The connecting member 820 is fixedly connected with a parking cable 600, which is spaced apart from the parking hinge pin 420 at one end thereof and is connected with wheels at the other end thereof.

Thus, when the first parking hinge pin 420 is rotated, the parking cable 600 is pulled or loosened through the connecting member 820.

Meanwhile, the lever 200 has a release button 710 protruding from a free end thereof. Thus, when releasing the parking brake, a driver presses down the release button 710. The release button 710 is connected with a release rod 720. The release rod 720 is connected to one end of a release link 730 having a release hinge pin 740.

The release link 730 is connected with a release cable 750 at the other end thereof. The release cable 750 is coupled with a pawl 760, and a pawl hinge shaft 770, i.e. a rotating central shaft of the pawl 760, is installed on a pawl mounting member 766 fixed to the first rod 400.

The release cable 750 is composed of a release inner wire 752 and a sheath 754. The sheath 754 is fixed to the lever 200 and the pawl mounting member 766 at opposite ends 757 and 758 thereof, respectively.

Further, a ratchet 780 with which the pawl 760 is engaged is installed on the lever bracket 300. A spring 768 is mounted between the pawl mounting member 766 and the pawl 760 such that the pawl 760 is kept engaged with the ratchet 780.

The operation of the parking brake lever apparatus having the aforementioned configuration will be described below.

When a driver pulls the lever 200 in order to activate the parking brake, the lever 200 is slowly rotated on a horizontal plane, as compared to that linked only to the first rod 400, because the lever 200 is linked to the first and second rods 400 and 500.

In detail, as illustrated in FIG. 3, the first and second rods 400 and 500 disposed parallel to each other have the same length, and are located on the same horizontal plane. Further, the first and second parking hinge pins 420 and 520 are located on the same horizontal plane. As such, the lever 200, which is linked to the first and second rods 400 and 500, is rotated on the horizontal plane.

Thus, the parking brake lever apparatus prevents a wrist of the driver from being bent.

Further, if necessary, the lengths of the rods 400 and 500 and the positions of the hinge pins 410, 420, 510 and 520 may be adjusted such that the lever 200 can be ergonomically designed for an optimum locus of movement.

The parking cable 600 is pulled when the first rod 400 is rotated around the first parking hinge pin 420. At this time, the pawl 760 mounted on the pawl mounting member 766 fixed to the first rod 400 is engaged with the ratchet 780 such that the parking cable 600 is kept pulled. Thereby, the parking brake is maintained in an activated state.

The spring 768 serves to maintain the engagement of the pawl 760 and the ratchet 780.

Meanwhile, when releasing the parking brake, the driver presses the release button 710 in the stat of FIG. 4(a). Then, the release button 710 pushes the release rod 720 in a backward direction, so that the release link 730, a first end of which is coupled to the release rod 720, is rotated around the release hinge pin 740, and simultaneously the release cable 750 opposite the first end of the release link 730 is pulled centering on the release hinge pin 740.

The pulled release cable 750 pulls the pawl 760 against elastic force of the spring 768 such that the pawl 760 is rotated around the ratchet hinge shaft 770 and thus is disengaged from the ratchet 780.

In this manner, when the driver pushes the release button 710 to disengage the pawl 760 from the ratchet 780, the lever returns to the state before the parking brake is activated.

As can be seen from the foregoing, the parking brake lever apparatus can ergonomically design the path of movement of the lever, so that it can prevent the wrist and shoulder of the driver from being overloaded when the parking brake is activated.

Further, lengths of the rods and positions of the hinge pins can be adjusted, so that the lever can be ergonomically designed for an optimum locus of movement.

For convenience in explanation and accurate definition in the appended claims, the term "upper" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A parking brake lever apparatus comprising:
    a lever pulled by a driver;
    first and second rods, first ends of which are connected with the lever through respective first and second lever hinge pins; and
    a lever bracket spaced from the lever and pivotally engaged with second ends of the first and second rods;
    wherein the first and second rods are parallel to each other and are disposed on the same plane perpendicular to a rotational axis of the second ends of the first and second rods; and
    wherein a pawl is pivotally coupled to the first rod and selectively engaged with a ratchet formed at the lever bracket in accordance with a pivotal rotation of the first and second rods.

2. The parking brake lever apparatus according to claim 1, wherein the first rod and the lever bracket are connected through a first parking hinge pin, to which a parking cable connected with wheels is fixed.

3. The parking brake lever apparatus according to claim 2, further comprising a connecting member, which is installed between the first parking hinge pin and the parking cable.

4. The parking brake lever apparatus according to claim 1, wherein the second rod and the lever bracket are connected through a second parking hinge pin.

5. The parking brake lever apparatus according to claim 4, wherein the first and second rods are installed parallel to each other.

6. A parking brake lever apparatus for a vehicle comprising:
- a lever operably activated by a driver;
- a connecting member rotatably coupled to a lever bracket which is fixed to a vehicle body and configured to support the connecting member;
- first and second rods, one ends of which are pivotally coupled to the lever with a predetermined distance therebetween and the other ends of which are connected to the connecting member, wherein the other end of the first rod is fixedly connected to rotation axis of the connecting member and the other end of the second rod is pivotally coupled to the connecting member and disposed with a predetermined distance from the rotation axis of the connecting member, wherein the first and second rods are disposed on the same plane perpendicular to rotational axis of the connecting member; and
- a position control unit to selectively hold the connecting member to a rotational position.

7. The parking brake lever apparatus according to claim 6, wherein the connecting member is fixed to the other end of the first rod by a hinge pin which is rotatably coupled to the lever bracket so that the connecting member is rotated by the hinge pin according to a rotation of the first rod.

8. The parking brake lever apparatus according to claim 6, wherein a parking cable selectively engaged with wheels of the vehicle is fixed to a position of the connecting member offset from the other end of the first rod with a predetermined distance.

9. The parking brake lever apparatus according to claim 6, wherein the position control unit includes:
- the lever bracket fixed to the vehicle body and having a ratchet;
- a pawl pivotally coupled to the first rod and selectively coupled to the ratchet of the lever bracket wherein the pawl is supported by an elastic member to supply a restoring force thereto; and
- an actuating member to actuate a rotation of the pawl.

10. The parking brake lever apparatus according to claim 9, wherein the actuating member includes:
- a release link pivotally coupled to the lever;
- a release rod coupling a release button and one end of the release link so as to transfer an external force applied to the release button to the one end of the release link; and
- a release cable connecting the other end of the release link and one end of the pawl to rotate the pawl.

11. The parking brake lever apparatus according to claim 9, wherein the pawl is pivotally coupled a mounting bracket fixed to the first rod.

12. The parking brake lever apparatus according to claim 6, wherein the first and second rods are installed parallel to each other.

13. A passenger vehicle comprising the parking brake lever apparatus according to claim 6.

\* \* \* \* \*